US010986713B2

(12) United States Patent
Malyna et al.

(10) Patent No.: US 10,986,713 B2
(45) Date of Patent: Apr. 20, 2021

(54) RETROFIT LAMP AND A LIGHTING SYSTEM USING THE SAME

(71) Applicant: SIGNIFY HOLDING B.V., Eindhoven (NL)

(72) Inventors: Dmytro Viktorovych Malyna, Achel (BE); Luna X. Zhang, Eindhoven (NL); Yuangiang Liu, Shanghai (CN); Gu Yuan Chen, Eindhoven (NL); Yun Fei Duan, Shanghai (CN); Tijmen Cornelis Van Bodegraven, Eindhoven (NL); Jie Fu, Shanghai (CN); Zhi Quan Chen, Shanghai (CN); Shiguang Sun, Shanghai (CN); Raimundo De Heer Galisteo, Uden (NL); Marcus Cornelis Van Meel, Helmond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/633,246

(22) PCT Filed: Jul. 23, 2018

(86) PCT No.: PCT/EP2018/069902
§ 371 (c)(1),
(2) Date: Jan. 23, 2020

(87) PCT Pub. No.: WO2019/020560
PCT Pub. Date: Jan. 31, 2019

(65) Prior Publication Data
US 2020/0178371 A1    Jun. 4, 2020

(30) Foreign Application Priority Data

Jul. 25, 2017  (WO) ................ PCT/CN2017/094304
Sep. 18, 2017  (EP) ..................................... 17191583

(51) Int. Cl.
*H05B 45/35*        (2020.01)
*H05B 45/48*        (2020.01)
(Continued)

(52) U.S. Cl.
CPC ....... *H05B 45/3578* (2020.01); *H05B 45/345* (2020.01); *H05B 45/37* (2020.01); *H05B 45/48* (2020.01); *H05B 45/54* (2020.01)

(58) Field of Classification Search
None
See application file for complete search history.

(56) References Cited

U.S. PATENT DOCUMENTS

2013/0221867 A1  8/2013  Deppe et al.
2013/0278161 A1  10/2013 Choi et al.
(Continued)

FOREIGN PATENT DOCUMENTS

| JP | 2013225508 A | 10/2013 |
| JP | 2013543642 A | 12/2013 |
| JP | 2017112058 A | 6/2017 |

*Primary Examiner* — Dedei K Hammond
(74) *Attorney, Agent, or Firm* — Daniel J. Piotrowski

(57) ABSTRACT

A retrofit lamp is to be used with a ballast. A shunt switch is provided in parallel with an output load and is adapted to shunt input terminals of the lamp using pulse width control so as to tune the current through the lighting element. This current control is used to enable compatibility with different ballasts and to provide dimming control. A detection circuit is used to detect an abnormal drive condition of the retrofit lamp and the pulse width control of the shunt switch can then be overridden by holding the shunt switch at a stable state for a certain duration. This prevents overload conditions and avoids DC signals in the event of component failures.

13 Claims, 7 Drawing Sheets

(51) Int. Cl.
    *H05B 45/3578*    (2020.01)
    *H05B 45/37*       (2020.01)
    *H05B 45/54*       (2020.01)
    *H05B 45/345*     (2020.01)

(56) References Cited

U.S. PATENT DOCUMENTS

| | | |
|---|---|---|
| 2013/0320869 A1 | 12/2013 | Jans et al. |
| 2014/0265900 A1* | 9/2014 | Sadwick ................ H05B 45/00 |
| | | 315/200 R |
| 2014/0320007 A1 | 10/2014 | Stamm et al. |
| 2015/0181667 A1 | 6/2015 | Tao et al. |

\* cited by examiner

RETROFIT LAMP AND A LIGHTING SYSTEM USING THE SAME

CROSS-REFERENCE TO PRIOR APPLICATIONS

This application is the U.S. National Phase application under 35 U.S.C. § 371 of International Application No. PCT/EP2018/069902, filed on Jul. 23, 2018, which claims the benefit of International Patent No. PCT/CN2017/094304, filed on Jul. 25, 2017 and European Patent Application No. 17191583.8, filed on Sep. 18, 2017. These applications are hereby incorporated by reference herein.

FIELD OF THE INVENTION

This invention relates to retrofit lamps, in particular DC driven lamps (such as LEDs) for use with AC both fluo and high-intensity discharge (HID) lamp ballasts.

BACKGROUND OF THE INVENTION

HID or fluorescent lighting arrangements are commonly used to light industrial or domestic buildings. Typically, such lighting arrangements comprise fluorescent tubes or HID lamps comprising mercury, where current flowing through the lamp causes it to emit light.

Gas-discharge lighting arrangements typically comprise an electromagnetic (inductor-based) or electronic (semiconductor switch-based) ballast adapted to provide an alternating current to the gas-discharge lamp. The ballast regulates the current flowing through the gas-discharge lamp to ensure that a runaway current does not cause damage to the lamp.

Recently, it has been increasingly desirable to replace gas-discharge lamps with an LED arrangement. This may be for reasons such as increased lifespan, greater efficiency and reduced used of potentially hazardous materials (such as mercury). Accordingly, there is a need for arrangements which may convert an output of the electromagnetic ballast into a form suitable for the LED arrangement.

In the simplest case, an LED string can be connected to the ballast using a diode bridge for converting high frequency AC power to DC and a capacitor for smoothing out the ripple current. If the LED string voltage is chosen substantially close to the burning/discharging voltage of the fluorescent tube, the LED string will receive a similar power and current as the gas-discharge lamp.

However, sometimes the LED lamp has a power rating substantially lower than that of a traditional ballast. Furthermore, a dimming function in the LED lamp is desired. Therefore, LED lamps for use as retrofit lamps need to be compatible with the ballast. It is known, such as in US2013/221867A1, to provide this compatibility using a shunt switch that bypasses the LED arrangement from the ballast. In order to make the ballast work smoothly, this shunt switch short circuits the output of the ballast. In every half cycle, the shunt switch functions to provide a short, for a certain time, to regulate the output current. By adjusting the LED voltage and duty cycle, the LED current can be controlled. This enables compatibility as well as enabling a dimming function.

However, if there is an abnormal supply event, for example a disturbance to the mains, instability and saturation can arise. For example, if there is a half cycle voltage interrupt, an electromagnetic ballast will become unbalanced and will saturate. This may cause an uncontrolled high current in the lamp and a circuit breaker function of the power supply/ballast may be triggered. This problem is a result of the use of the shunt switch topology since the shunt switch, when conducting, has a very high impedance and causes the high current (while it is not a substantial problem for a conventional lamp since it always has a sufficiently high impedance).

Normally the ballast works with a balanced voltage over time so that the excitation current and demagnetizing current will always be equal. The interrupt disrupts this balance.

There is also a desire to prevent DC voltage levels remaining active in the event of a fault. In any single fault condition, the DC components of the input current and voltage in the ballast should for example be lower than 2% in order to meet some safety standards such as UL certification. For a shunt switch topology, when one of the rectifier bridge diodes is shorted, the voltage drop on the ballast again will be asymmetrical and have very high DC current component. This is another type of abnormal supply event. Thus, there are abnormal supply events resulting from the external supply to the lamp, and abnormal supply events resulting from component issues in the lamp.

To address this issue of rectifier diode failure, some proposed drivers use two diodes in series instead of one in each bridge arm, giving 8 diodes in total for a rectifier bridge. This increases cost, power loss, and needs more space. In a high lumen shunt switch driver, the diode power loss is significant so it becomes unacceptable to use double diodes.

Thus, the shunt switch driver topology introduces some difficulties in tolerating abnormal drive conditions, either resulting from external disturbances or internal component failures.

SUMMARY OF THE INVENTION

To cope with the abnormal conditions, such as mentioned above, in a shunt switch-based LED lamp, is the goal of the embodiments of the invention. It is a concept of the invention to provide a retrofit lamp to be used with a ballast in which lamp a normal PWM control of a shunt switch is overridden and the shunt switch is held in one state, instead of being switched in a pulse width modulation manner, for example for a duration to mitigate a potential risk when there is an abnormal drive condition of the retrofit lamp. This is used to prevent the potential risk caused by the abnormal drive condition, which risk may be an overcurrent situation due to mains interrupt, or DC current or voltage build up in the event of a component failure.

The invention is defined by the claims.

According to examples in accordance with an aspect of the invention, there is provided a retrofit lamp to be used with a ballast, comprising:

a pair of input terminals adapted to connect to said ballast;

an output load to be driven by said ballast and comprising at least a lighting element;

a shunt switch in parallel with said output load and adapted to shunt said input terminals using pulse width control so as to tune the current through the lighting element;

a detection circuit adapted to detect an abnormal drive condition of the retrofit lamp;

a control circuit adapted to override the pulse width control of the shunt switch and to hold the shunt switch at a stable state for a certain duration.

This lamp provides shunt switching to regulate the output current. This shunt switching for example takes place every half cycle of an input signal from the ballast, or takes places per multiple cycles of the ballast output signal. When the shunt switch is turned off, the lighting element, optionally together with an energy storage element, is provided with current from the ballast; when the shunt switch is turned on, the lighting element is provided with current from the energy storage element (such as a capacitor) or not powered at all, rather than from the input. The shunt switching is implemented as a regular periodic current control cycle to maintain a desired lighting element current. However, if there are abnormal drive conditions, such as disturbances to the power supply at the input terminals or problems in rectification of the ballast signal, current overload can arise. The control circuit and detection circuit override the regular periodic control of the shunt switch. This for example prevents the ballast becoming saturated.

In one set of examples, the abnormal drive condition may be an overcurrent condition, and the detection circuit then comprises:

a current sensing element adapted to sense the current through the shunt switch when said shunt switch is conductive; and a comparing circuit adapted to compare the sensed current with a threshold;

and the control circuit is adapted to hold the shunt switch at high impedance state to override said pulse width control when the sensed current exceeds the threshold.

In this way, an overcurrent risk, caused by for example mains disturbances to the power supply/ballast, at the input terminals is detected. The control circuit and current sensing element ensure that the shunt switch current is kept below a threshold, by turning off (i.e. increasing the impedance) of the shunt switch when needed. This increases the impedance of the retrofit lamp and helps to prevent the ballast becoming saturated, since this saturation gives rise to large current flow when the shunt switch is turned on. In particular at this time the load presented to the ballast by the lamp is low due to the conduction of the shunt switch. In this embodiment, the lighting element is used for providing a high impedance to the ballast and helps to limit the overcurrent.

In a further embodiment, the lamp may comprise a diode bridge rectifier between the input terminals and the output load, and the shunt switch is placed between the diode bridge rectifier and the output load, wherein said ballast is an electromagnetic ballast.

The risk of overcurrent due to a mains interrupt is substantially critical for electromagnetic ballasts. This embodiment can well cooperate with the electromagnetic ballast and mitigate the potential risk.

The current sensing element for example comprises a current sense resistor for sensing a current flowing to or from one of the input terminals, and said current sense resistor is in series between the diode bridge rectifier and an interconnection of the shunt switch and the output load, and the control circuit is adapted to turn off said shunt switch.

When the shunt switch is turned on, the current sensed is the current flowing through the shunt switch. This embodiment provides a low cost implementation of the current sensing element.

The comparing circuit may comprise a comparator for comparing the voltage across the current sense resistor with a reference value, and wherein the output of the comparator is used to control the shunt switch.

This provides a simple control circuit for operating the shunt switch, in particular opening the shunt switch when the current reaches a threshold.

The control circuit may comprise a control gate between the output of the comparing circuit and a control terminal of the shunt switch.

The control gate alters/overrides the normal control cycle of the shunt switch. In particular, the comparator output functions as a disable line, so that whenever the comparator output indicates a high current, the shunt switch is turned off and it is held in a high impedance state.

In case the lighting element is still not sufficient to limit the overcurrent safely, in a further embodiment, the output load further may comprise a current limiting circuit in series with the lighting element.

This current limiting element is used to protect the lighting element and limit the overcurrent. When the shunt switch is forced to switch off because of a detected high current, the current will flow to the output load. It is therefore desirable to limit the current that can flow to the lighting element to prevent damage. It is noted that this is only an optional preferred embodiment, if the lighting element is sufficient to limit the overcurrent safely, the use of a current limiting element in series with the lighting element can be avoided.

The current limiting circuit may be adapted to limit the current through the lighting element below a maximum value. The current limiting circuit for example comprises a current source circuit. The current source circuit for example comprises a linear transistor. This provides a low cost implementation for the current limiting circuit.

In another set of examples, there is again a diode bridge rectifier between the input terminals and the output load, and the shunt switch is placed between the diode bridge rectifier and the output load, wherein the abnormal drive condition is a short circuit of at least one diode in said diode bridge rectifier. The ballast is typically an electromagnetic ballast, the short creates unbalanced driving of the load/unbalanced current at the electromagnetic ballast.

In this case, the control circuit is adapted to hold the shunt switch at a low impedance state to override said pulse width control when the short circuit of at least one diode in said diode bridge rectifier is detected. The retrofit lamp is thus kept at the low impedance state, and the ballast's output throughout the whole cycle is symmetric due to the constant impedance throughout the whole cycle.

In this way, DC components are reduced and shorting of a rectifier diode can be tolerated again by taking over control of the shunt switch.

The detection circuit may then comprise a voltage detection circuit coupled to a first diode in said diode bridge rectifier and adapted to detect the short circuit according to a change of a voltage on said first diode, and said control circuit is adapted to turn on said shunt switch constantly in both positive and negative half cycles of an output of the electromagnetic ballast. The voltage change is representative of diode shorting because the rectification function is altered.

In one half cycle during which the current flows through the shorted diode, the shorted diode renders the impedance of the lamp low; and in an alternative half cycle wherein the current does not flow through the shorted diode, the shunt switch is turned on and still renders the impedance of the lamp low. Thus the impedance of the lamp is always low in both half cycles, the current from the ballast is symmetrical in both half cycles, and thus there is less DC component in the current.

In all examples, the output load may further comprise a storage capacitor in a circuit branch which is in parallel with a circuit branch of the lighting element.

This storage capacitor provides current to drive the lighting element when the shunt switch is turned on. It is in parallel with the lighting element circuit branch, which itself may include the series current limiting circuit.

The output load may further comprise a series diode in a forward direction from the shunt switch to the storage capacitor.

The diode functions as an isolator to prevent the shorting of the lighting element (and discharge of any associated charge storage element such as the storage capacitor) when the shunt switch is turned on. It is in series in the sense that it is between one terminal of the output load and the remainder of the output load i.e. the lighting element, storage capacitor and current limiting circuit.

In still another aspect of the invention, instead of passively damping the overcurrent caused by a saturation of the ballast in an absence of a phase of the AC mains input to the ballast, the shunt switch is controlled to actively counter the absence of the phase of the AC mains input to the ballast, so as to prevent the ballast from saturation. More specifically, in this aspect, said abnormal drive condition comprises an absence of a phase of an AC voltage input to the ballast, and said control circuit is adapted to hold the shunt switch at high impedance state to override said pulse width control in synchronization with said absence of the phase of the AC voltage input into the ballast.

This aspect suggests a principle that uses detection of mains dip and opening the shunt switch MOSFET M1 once the dip is detected. In this way the voltage that is applied to the inductor of the ballast is not zero anymore, but LED voltage. Ballast current quickly decays to zero and the flux density reduces. Switch stays open till next zero crossing. When the mains recovers, the inductor of the ballast can still limit the input current and the input current stays within the limits of the main circuit breaker.

More preferably, the control circuit is further adapted to: switch a configuration of the output load to a high forward voltage state when holding the shunt switch at high impedance state in the abnormal drive condition of the retrofit lamp; and switch the configuration of the output load to a low forward voltage state otherwise.

In this embodiment, increased LED load voltage would lower the inrush current under abnormal conditions. But considering ignitor compatibility, LED load voltage is expected to low enough to avoid trigger ignitor operation. Thus in normal operation, the LED voltage range is decreased again back to the safe range, eg. <150V, which will not trigger the ignitor operate. In a more specific embodiment, the LEDs arrangement can be switched from parallel connection in normal operation to series connection in abnormal operation so as to provide the high forward voltage.

In a further embodiment, there is still some high LED current after the recovery of the mains. In order to solve this, said control circuit is further adapted to control the shunt switch to turn on and off alternatively in at least one subsequent AC period after a recovery of the phase of the AC voltage input to the ballast so as to reduce the current amplitude provided to the output load. More specifically, when the current from the ballast into the LED is higher than a threshold (such as an upper limit that may lead to early failure of LED), the shunt switch can be forced to be close to decrease the current into the LED.

In a further embodiment, said control circuit comprises: a current sensing component for sensing the current from the ballast; a zero crossing detection component for detecting, from the sensed current, a zero crossing of the current from the ballast; a dip detection component for detecting, from the sensed current, said absence of the AC voltage input to the ballast; and a flip-flop component for outputting an logic to turn off said shunt switch upon a trigger of the detected zero crossing at the zero crossing detection component or the detected absence of the AC voltage input at the dip detection component. This embodiment provides a flip-flop based embodiment for controlling the shunt switch which is fast, reliable, and low cost.

The lighting element for example comprises an LED array. The lamp may be a tubular LED lamp or a HID lamp.

The invention also provides a lighting system comprising:
a gas-discharge lighting unit ballast; and
a retrofit lamp as defined above.

The ballast is for example an electromagnetic ballast.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a retrofit lamp to be used with a ballast wherein a shunt switch is provided in parallel with an output load and adapted to shunt input terminals of the lamp using pulse width control so as to tune the current through the lighting element. This current control is used to enable compatibility with different ballasts and to provide dimming control. A detection circuit is used to detect an abnormal drive condition of the retrofit lamp and the pulse width control of the shunt switch can then be overridden by holding the shunt switch at a stable state for a certain duration. This prevents risk caused by the abnormal condition such as overload conditions or DC signals in the event of component failures.

Figure 1:
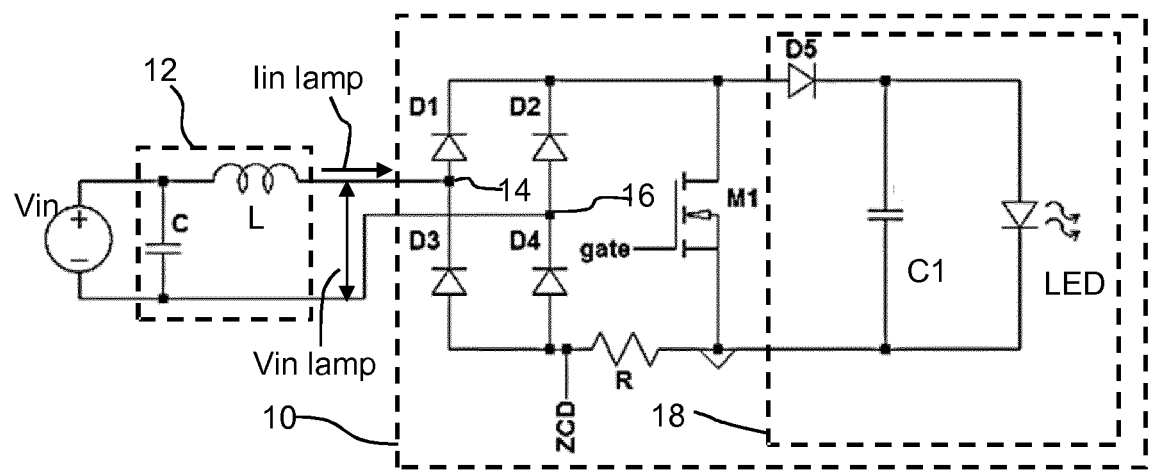
FIG. 1 shows a known LED lamp connected to a ballast.

FIG. 1 schematically shows an LED lamp 10 connected to an electromagnetic ballast 12. The ballast 12 receives a mains input Vin and is schematically represented as an inductor L and capacitor C. The ballast 12 is typically an electromagnetic ballast. It has a pair of output terminals which connect to input terminals 14, 16 of the lamp 10.

There is a lamp input voltage "Vin lamp" across these terminals and input current "Iin lamp" into one terminal (and out of the other terminal). The input terminals connect to a full bridge rectifier comprising four diodes D1, D2, D3, D4. The rectified power signal provides current to a load 18 in the form of the LED arrangement ("LED") and a parallel buffer capacitor C1. There is a diode D5 between the one output terminal of the rectifier and one end of the parallel combination of the LED arrangement LED and the capacitor C1. This diode prevents discharge of the buffer capacitor C1 other than through the LED arrangement. There is a current sense resistor R between the other output terminal of the rectifier and the and the other end of the parallel combination of the LED arrangement LED and the capacitor C1.

In parallel with the load 18 is a shunt switch M1 controlled using pulse width modulation of a gate signal "gate".

In each half cycle of the input to the LED lamp 10, more specifically in each half cycle of the input current Iin lamp, the shunt switch M1 regulates the output current by shorting the load for a fraction of the cycle. The same shunt function is performed in opposite polarity half cycles to provide balanced control.

Figure 2:
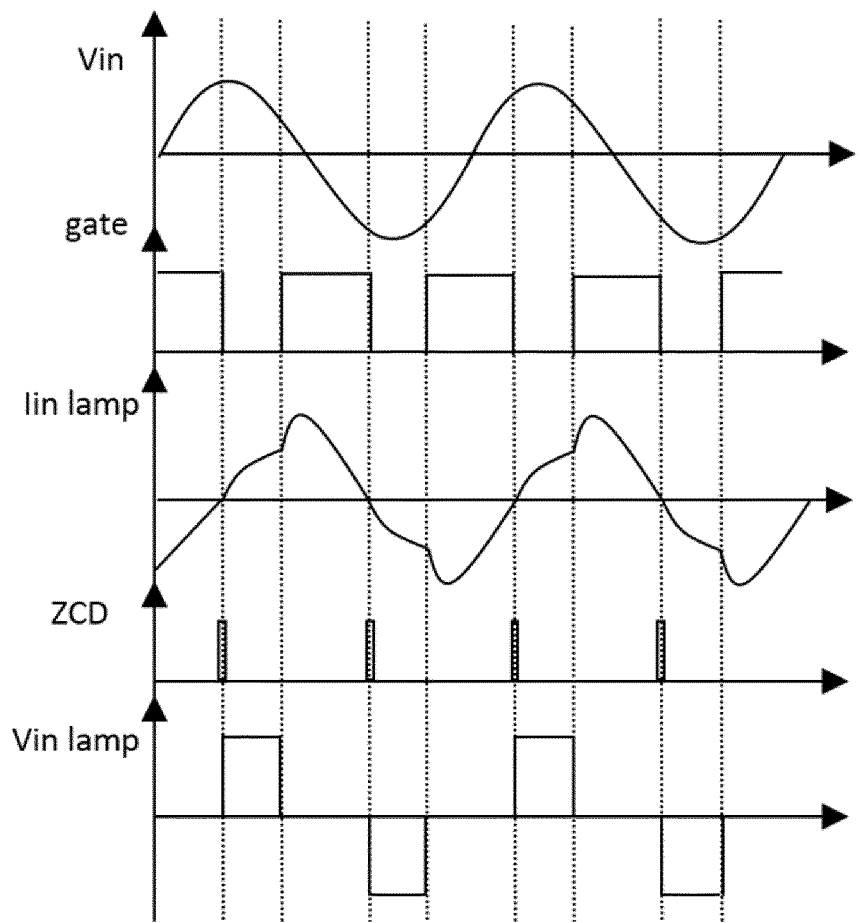
FIG. 2 shows the waveforms in the circuit of FIG. 1 during normal operation.

FIG. 2 shows the waveforms in the circuit of FIG. 1 during normal operation.

The top plot shows the mains input Vin.

The second plot shows the gate signal. When it is high, the lamp voltage Vin lamp is shorted to zero.

The third plot shows the current Iin lamp. It is not in phase with the input voltage as a result of the inductance L of the ballast. It also shows an initial increase in the magnitude of the slope when the shunt switch is closed. When the gate signal of the MOSFET M1 is high, the current is shunted back to the ballast without flowing into the LEDs; when the gate signal of the MOSFET is low, the current flows into the LEDs. In the example as shown, the non-shunting duration happens at the start of each half cycle (at zero crossing of the input current) and then the shunting duration follows. It can be understood that this order may be reversed: the shunting duration may happen at the zero crossing and then the non-shunting duration follows.

The fourth plot shows a zero crossing detector (ZCD) signal which detects crossing points of the lamp current Iin lamp. This is used to set the timing of the gate control signal and in this example it defines the end timing of the gate control signal. This signal may be obtained via the current sense resistor R or via voltage detection on one of the rectifier diodes.

The bottom plot shows the lamp voltage Vin lamp. The ballast enables a substantially constant voltage magnitude to be delivered to the lamp as a result of the constant forward voltage of LEDs, the smoothing function of the inductor and capacitor over the timescale of the AC period.

Figure 3:
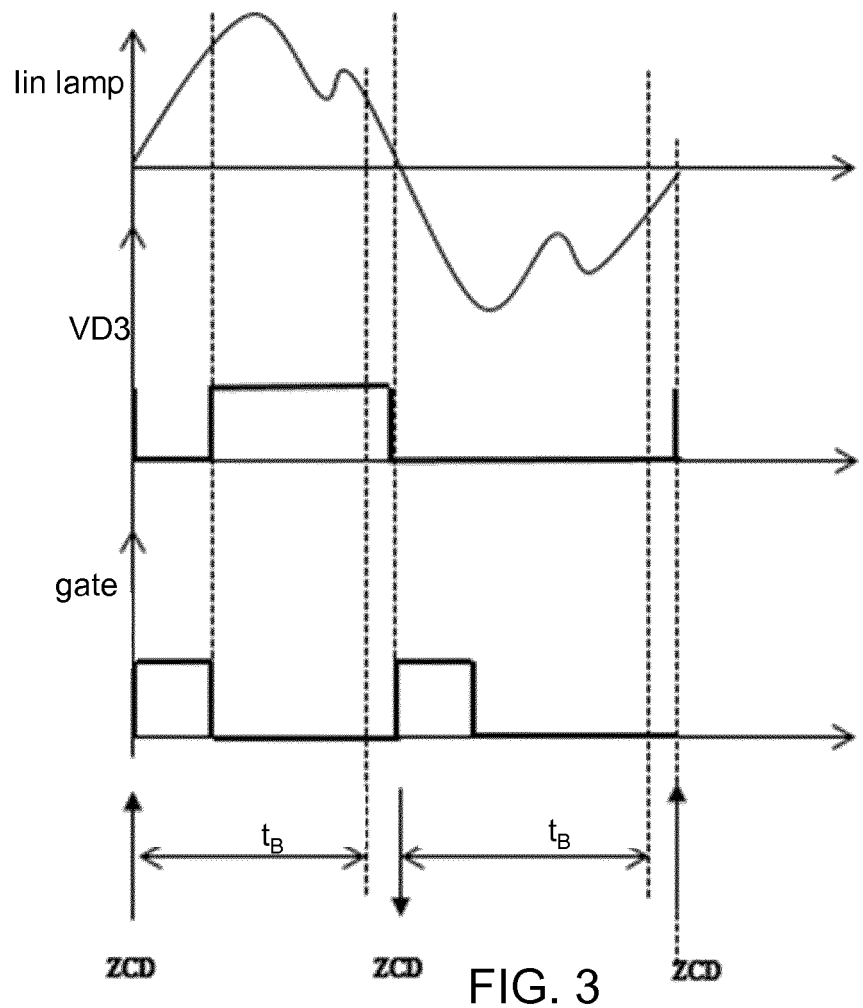
FIG. 3 shows the conduction time for one exemplary diode of the diode bridge.

FIG. 3 shows the conduction time for one exemplary diode D3 of the diode bridge. Each diode only conducts during one of the half cycles and only when the shunt switch is open.

The top plot shows the lamp input current Iin lamp, the second plot shows the voltage VD3 across one diode D3 of the diode bridge, and the bottom plots shows the shunt switch gate signal. The zero crossing detector signal ZCD in this example instead sets the timing of the start of the gate control signal "gate".

There is a blanking period $t_B$ from a crossing point of the current Iin lamp, and in this blanking period $t_B$ the voltage on the diode D3 is not detected or any trigger is ignored so as to exclude misdetection of a false zero crossing. This may be needed as a result of oscillations which may arise at a certain time (e.g. 6 ms) after each zero crossing. By setting $t_B$ to be larger (e.g. 7 ms) this oscillation is blanked and the right signal is always detected.

A first aspect of the invention relates to the problem that a disturbance to the mains signal Vin can disrupt the balance (over time) of the circuit operation, which can result in an overcurrent situation.

Figure 4:
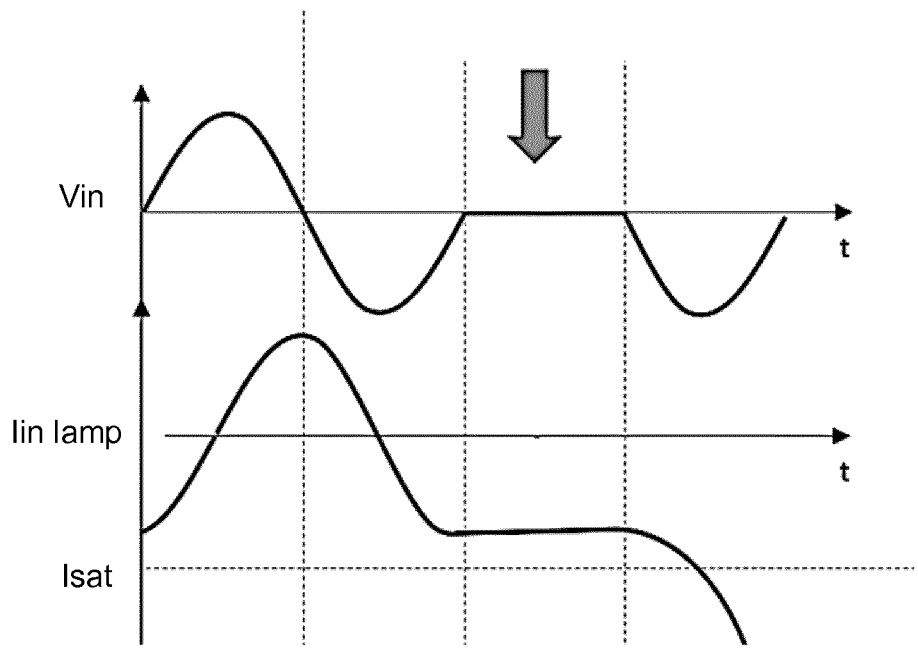
FIG. 4 shows the effect of an interruption to one half cycle of the mains input Vin.

The effect of an interruption to one half cycle of the mains input Vin is shown in FIG. 4. One positive half cycle is missing (alternatively one negative half cycle is missing). The effect of this is that the input current "Iin lamp" is not driven positively by the ballast inductor but remains constant. In general, the current during a mains interrupt will remain constant or it may decrease slowly because of no voltage drop. Thus, the ballast creates two successive cycles of current reduction causing the current to decrease (but increase in magnitude) beyond a saturation current Isat of the ballast.

This imbalance and saturation of the ballast will cause an uncontrolled high current in the lamp and the circuit breaker of the power supply (ballast) will trigger.

Figure 5:
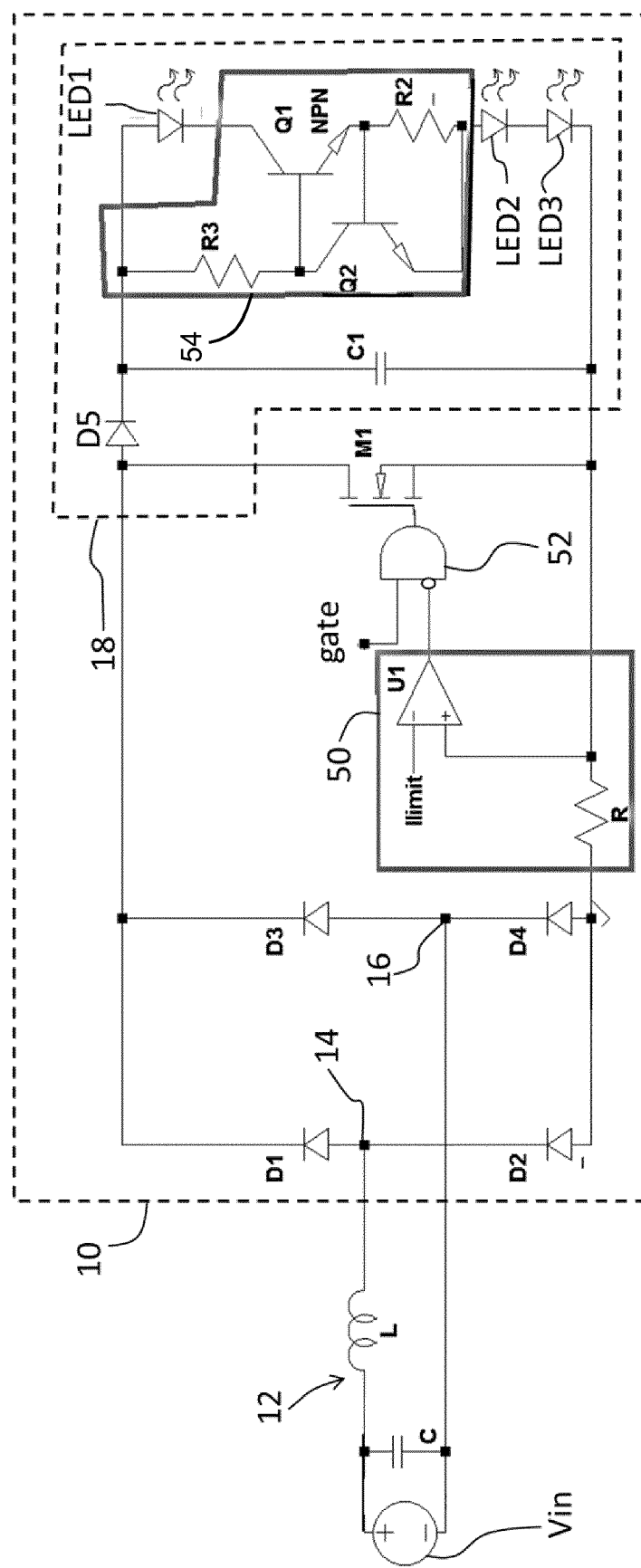
FIG. 5 shows an example of a circuit for preventing current overload.

FIG. 5 shows an example of a circuit for preventing current overload.

The same circuit components as present in FIG. 1 are given the same reference numbers.

The LED lamp 10 is again connected to an electromagnetic ballast 12 which receives a mains input Vin. The ballast has a pair of output terminals which connect to the input terminals 14, 16 of the lamp 10. The full bridge rectifier again comprises four diodes D1, D2, D3, D4. Three LEDs of the load 18 are shown (LED1, LED2, LED3) as well as the parallel buffer capacitor C1 and the diode D5. The shunt switch M1 is in parallel with the output load 18.

The lamp 10 further comprises a detection circuit 50 which is used to detect an abnormal drive condition of the retrofit lamp. In the example of FIG. 5, the detection circuit is for detecting an overcurrent situation.

A control circuit 52 is adapted to override the pulse width control of the shunt switch M1 and to hold the shunt switch at a stable state for a certain duration. The control circuit 52 for example comprises a control gate between the output of the detection circuit and a control terminal of the shunt switch M1.

In this embodiment, this duration is linked to the time during which the overcurrent situation is detected. More specifically, the duration is as long as the overcurrent situation may last.

The detection circuit 50 comprises the current sense resistor R which is also used for the normal cyclic control such as current control for dimming purpose, and it senses the current through the shunt switch M1 when the shunt switch is conductive. A comparing circuit U1 compares the sensed current with a threshold "Ilimit". The comparing circuit U1 comprises a comparator.

When the limit is exceeded, the output of the comparator U1 goes high. The control circuit 52 is an AND gate, and it receives an inverted version of the comparator output. The other input to the AND gate is the normal gate control signal "gate" which is the PWM signal. Thus, when the comparator output is high, the output of the AND gate is forced low and the shunt switch M1 is turned off.

The AND gate thus holds the shunt switch off (i.e. at a high impedance state) to override the pulse width control provided by the signal "gate" when the sensed current exceeds the threshold. This arrangement prevents the ballast becoming saturated by reducing the time that the ballast is presented with a short circuit load.

The gate control signal provides the normal control cycle of the shunt switch. The comparator output functions as a disable line, so that whenever the comparator output indicates a high current, the shunt switch is turned off.

Since the shunt switch M1 is turned off, the input current has to flow through the LED which has a certain impedance so as to limit the over current.

In a preferable embodiment, in order to protect the LED from being damaged by the overcurrent, as well as providing a more reliable current limiting function, the output load 18 further comprises a current limiting circuit 54 in series with the lighting element arrangement (LED1, LED2, LED3). As shown, the current limiting circuit 54 may be in the middle of the LED string, but it may equally be at either end.

This current limiting circuit 54 is used to protect the lighting element. When the shunt switch M1 is forced to switch off because of a detected high current, the current will flow to the output load (i.e. the buffer capacitor and the LED arrangement). It is therefore desirable to limit the current that can flow to the lighting element to prevent damage.

Without the current limiting circuit, there could be situations in which the LED current could keep increasing. The current limiting circuit causes the output capacitor to store more energy and thus helps to discharge the ballast. Note that the current limiting circuit may not be needed if the output current will still remain within the specifications of the LED arrangement.

The current limiting circuit 54 for example comprises a linear current source comprising a pair of back to back bipolar NPN transistors Q1 and Q2. The current is set by resistor R2, e.g. 0.7/R2 where the gate voltage of Q2 is 0.7V. When the current exceeds the desired limit, the voltage across R2 turns on the transistor Q2 which then lowers the base voltage of the transistor Q1 and makes the transistor Q1 operate in linear mode, thus the impedance of the load as a whole increases and reduces the current of the LED arrangement. Q1 is in a saturation mode of operation during normal operation and has very low power dissipation. More specifically, when the current on R2 is within the limit, the transistor Q2 is not conductive, and the base voltage of the transistor Q1 is still high and the transistor Q1 is in saturation mode.

Transistor Q2 is a small signal transistor which is used to control the current through Q1. The current through Q2 is very low, so the LED current (of all LEDs) is essentially the same as the current through Q1.

The overall circuit limits both the input and output current to the LED arrangement.

There are many different current source circuits which may be used to provide a current limiting function, and this is only one simple example.

A second aspect of the invention relates to the problem of a short across a diode of the rectifier.

Referring back to FIG. 3, the signal VD3 normally has the same frequency as the mains input and has a symmetric square waveform (when the shunt switching is not considered). However, when one diode in the rectifier is shorted, VD3 will be asymmetric.

It will have the same frequency as the mains. However, if both rising and falling edges are detected with every edge being treated as an event, the event signal will have double the frequency of the mains. The asymmetry of this signal can be used as a detection mechanism. The fault condition is thus easy to be diagnose using a controller. There are also other known solutions to detect a short circuiting of a diode in the rectifier.

When the controller detects an abnormal mains signal, it again provides a control signal to M1 to turn it on. Again, by shorting using M1 the ballast will have a symmetric voltage and current. The shunt switch M1 is turned on at least in a complementary manner with respect to the duration in which the shorted diode shorts the rectifier bridge. More specifically, if for example D4 short circuits, in a negative half cycle wherein the terminal 16 is positive, D4 directly conducts the input current back to the terminal 14 via the diode D2 and here the MOSFET M1 may be either closed or open. In the positive half cycle wherein the terminal 14 is positive, the shunt switch M1 conducts, and the input current flows via diode D1, MOSFET M1 and diode D4 back to the terminal 16. In a further embodiment, the MOSFET M1 is always closed in both positive and negative half cycles.

In this embodiment, the certain duration, for which the state of the shunt switch is held as low impedance, may be forever since the short circuited diode is not likely to be recovered.

The circuit may be used to monitor the voltage across two diodes in different branches of the rectifier, for example diodes D3 and D4. If any diode in the diode bridge is shorted, either D3 or D4 voltage will be a constant DC voltage.

Figure 6:
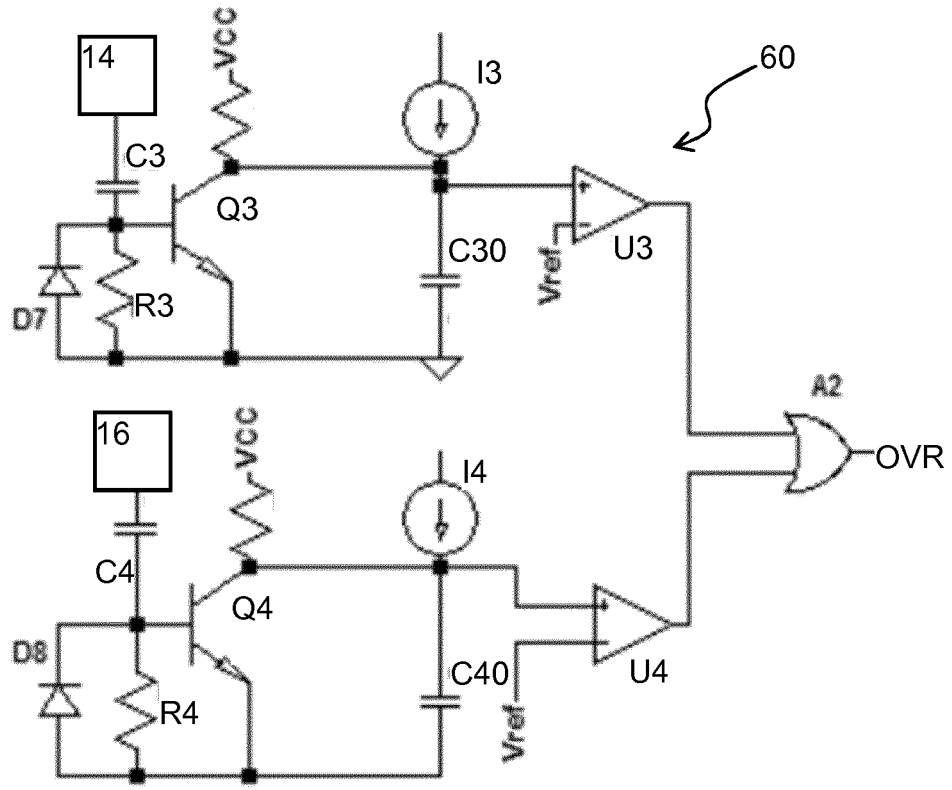
FIG. 6 shows an example of a circuit for detecting failure of a diode in the rectifier bridge.

FIG. 6 shows an example circuit 60 which is for detecting this alternative form of abnormal drive condition of the retrofit lamp. The voltages across diodes D3 and D4 are monitored. For example, the voltage across diode D3 corresponds to the voltage at input 14 and the voltage across diode D4 corresponds to the voltage at input 16.

For each monitored voltage, there is a DC blocking capacitor C3, C4 in series with a sense resistor R3, R4. The sense resistor delivers a gate voltage to a transistor Q3, Q4.

When the voltage across diode D3 or D4 is constant the resistor R3, R4 no longer receives a charging current from the DC blocking capacitor C3, C4, so the transistor Q3, Q4 will stay off.

The capacitor C3, C4, resistor R3, R4 and transistor Q3, Q4 together function as a detection circuit, which detects a short circuit according to a frequency and/or shape change of a voltage on the respective monitored diode. There is also a change in the symmetry of the voltages across the diodes other than the one which has become short circuit.

A current source 13, 14 delivers charge to a capacitor C30, C40. When the voltage across the capacitor C30, C40 goes higher than a reference Vref, an output of a comparator U3, U4 goes high. When either of these comparator outputs goes high (as determined by OR gate A2), the shunt switch is turned on by override signal "OVR". In normal operation, C30 and C40 are reset to 0V at each mains cycle, based on cyclic charging and discharging caused by transistors Q3 and Q4 cyclically turning on and off. A rectifier diode D7, D8 in each circuit ensures that there is only control of the transistor Q3, Q4 during positive half cycles, giving a cyclic charging operation. By carefully setting the value of Vref, the comparator will never trigger during normal operation.

In this case, the control circuit is adapted to hold the shunt switch M1 at a low impedance state (on) to override the pulse width control when a short circuit of at least one diode in said diode bridge rectifier is detected. The shunt switch is turned constantly in both positive and negative half cycles while the diode short circuit fault remains present.

The circuit of FIG. 6 may replace the circuit 50 of FIG. 5. In this case, the signal "OVR" of FIG. 6 may be provided to an OR gate with the main gate control signal "gate", and the output of the OR gate is provided to the shunt switch.

Figure 7:
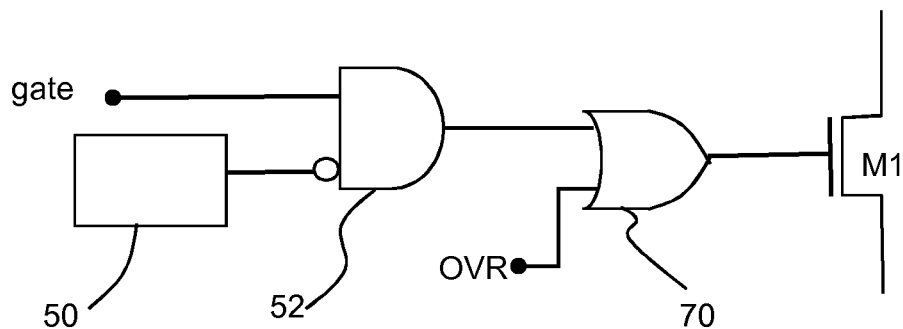
FIG. 7 shows how the control signals from the circuits of FIGS. 5 and 6 may be combined.

Alternatively, the two approaches may be used in combination. In this case, the circuit of FIG. 6 takes precedence, i.e. whenever a diode failure is detected, the shunt switch is turned on. This can be achieved with the circuit shown in FIG. 7, in which an additional OR gate 70 is provided between the AND gate 52 of FIG. 5 and the shunt switch M1.

Figure 8:
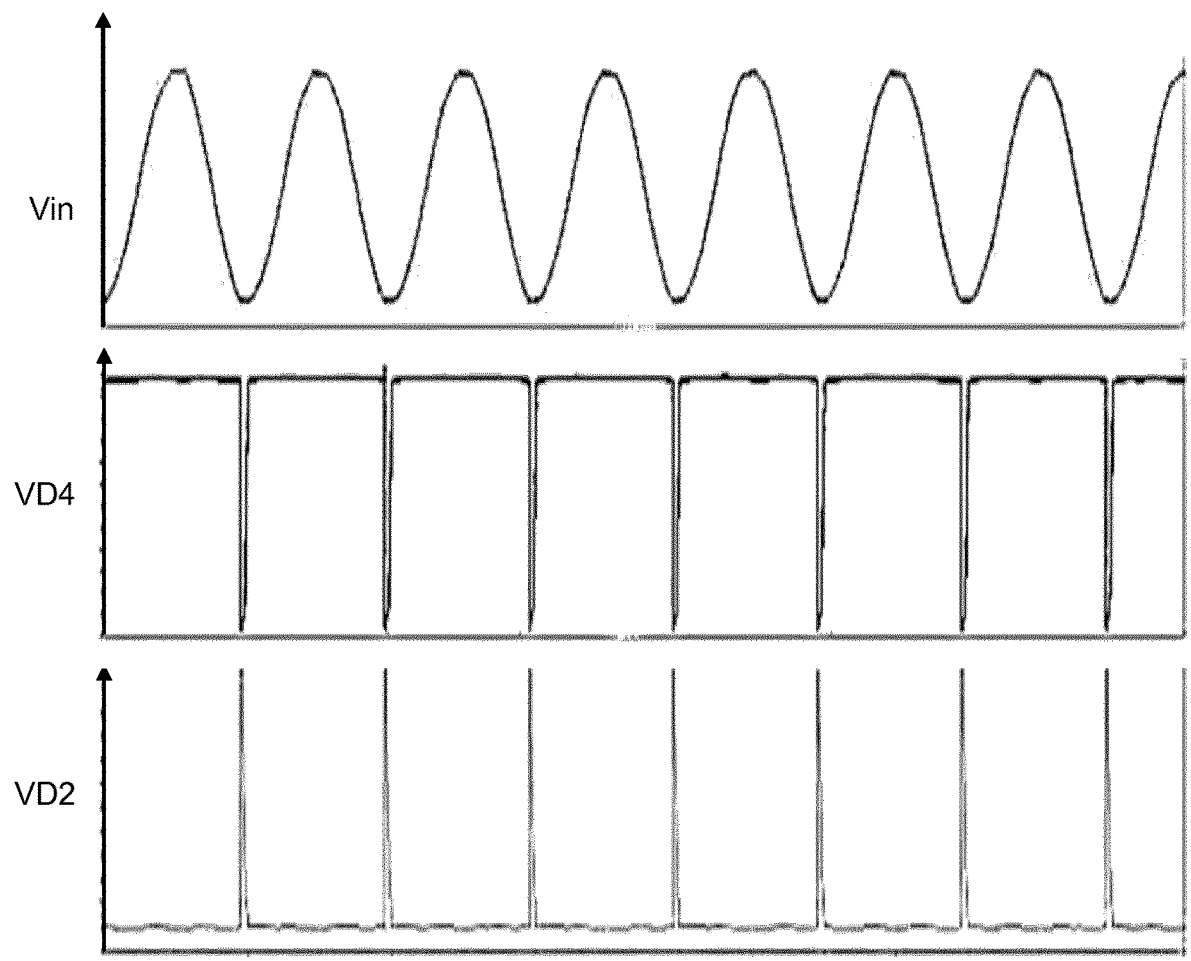
FIG. 8 shows voltage waveforms to show the effect of the failure of a diode in the rectifier bridge.

FIG. 8 shows voltage waveforms for the input voltage Vin and the diodes D2 and D4 in the event of a short across diode D3. It shows that a short in one diode gives rise to an asymmetric voltage waveform across the other diodes.

It can be seen from the examples above that in different situations the shunt switch may need to be held on (low impedance short circuit) or off (high impedance open circuit) depending on the type of abnormal drive condition detected.

The current detecting circuit and voltage monitoring circuit are only examples and many alternative circuits may be used. Similarly, the current source circuit may be of any type, or other current limiting circuits may be used.

Two examples of "abnormal drive condition" have been discussed above. But those skilled in the art may understand that, by overriding the PWM switching of the shunt switch and holding its state, other abnormal drive conditions can be handled. In an example, an open circuit of one diode can also be mitigated. For example, if D2 in FIG. 5 is open circuit, when the input voltage is in the negative half cycle, D4 will take a high voltage and break down, thereby becoming a short circuit. This short circuit will be detected and the above embodiment can use the shunt switch M1 to short circuit the positive half cycle to reduce the DC component.

In a further embodiment, still another abnormal drive condition is coped with. This abnormal drive condition is the root cause of the abovementioned overcurrent in the first embodiment. It is the absence of mains half-cycle(s) of the AC input voltage into the ballast, also called as a mains dip. During the absence of the mains half-cycle(s) of the AC input voltage, a flux density in the inductor of the ballast during this dip will stay somewhere between a positive max and a negative max. When mains recovers and re-applies, the inductor will quickly saturate when positive max is reached. Saturation of the inductor will be observed as a current spike of high amplitude. This high current spike will trip a mains circuit breaker (MCB) which is a part of electrical installation, and power will be off. Such a turn-off of the light is simply unacceptable. The similar phenomena occurs at startup when the lamp is turned on. Another negative effect of the ballast saturation and the following (high) inrush current is that when the shunt switch is getting open, the inrush current will flow to the buffer el-cap and charge it first together with increasing LED current. Too high LED current will result in failure of LEDs and the lamp.

Figure 9:
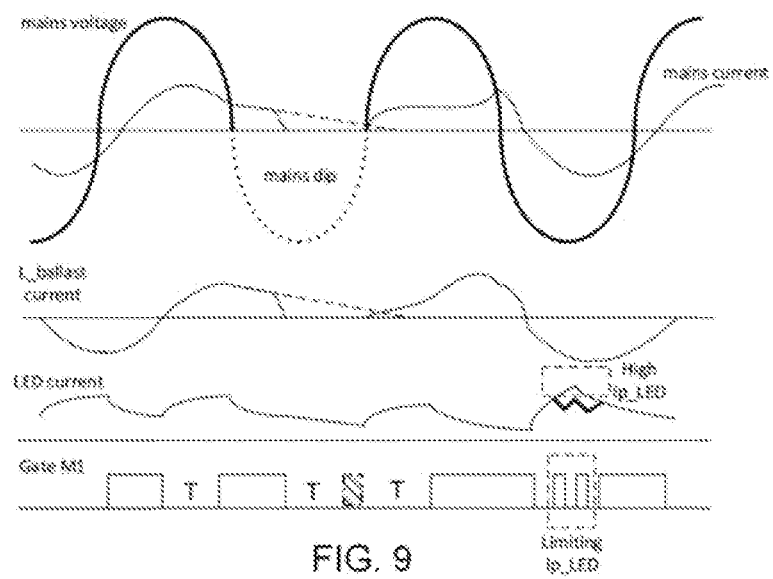
FIG. 9 shows the operation of the shunt switch versus the interruption to one half cycle of the mains input Vin.
Figure 10:
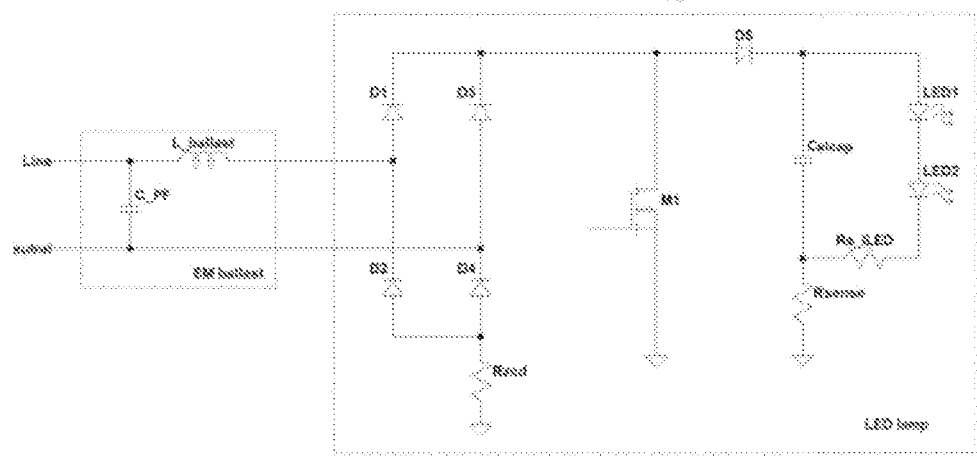
FIG. 10 shows another LED lamp connected to a ballast.
Figure 11:
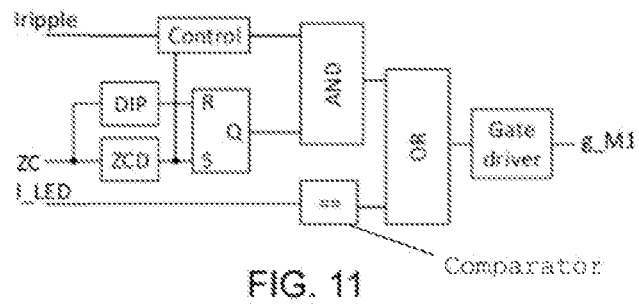
FIG. 11 shows an implementation of the embodiment in FIG. 9 in the lamp in FIG. 10 based on a R-S flip-flop component.
Figure 12:
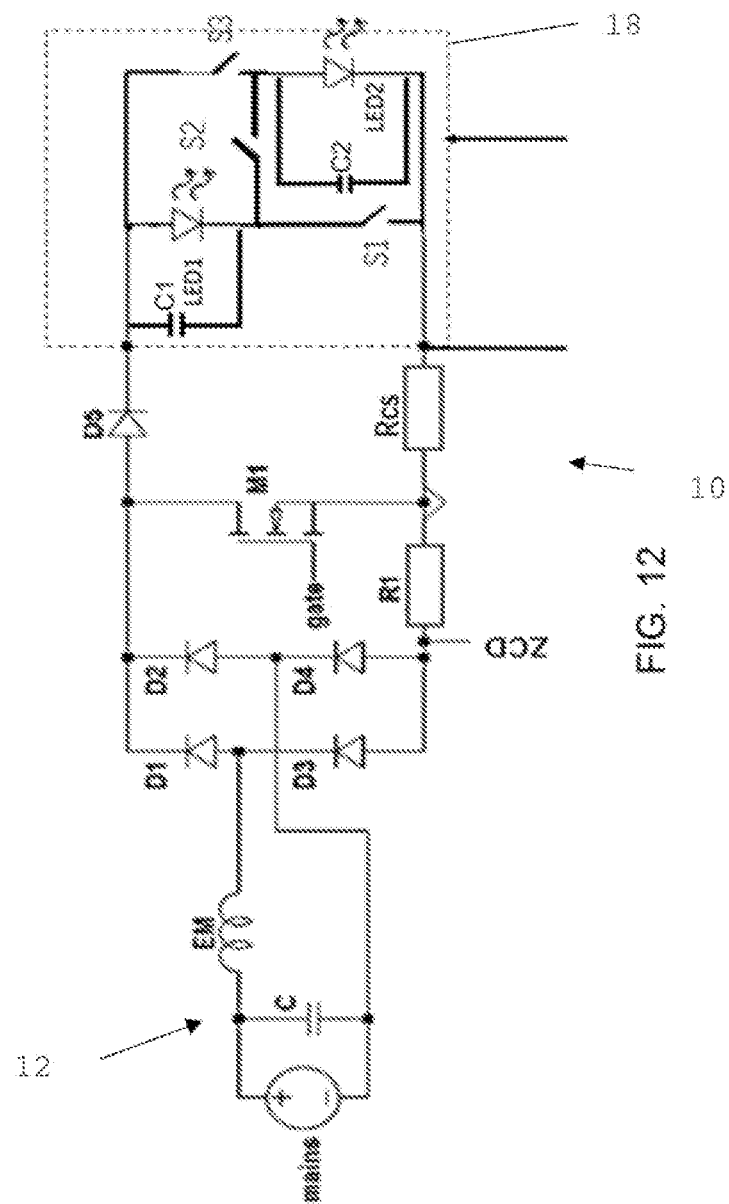
FIG. 12 shows a further improvement of the embodiment in FIG. 9.

With reference to FIGS. 9 and 10, the shunt switch M1 is open after the zero crossing of the ballast output current which is shown as L_ballast current. In this way, the ballast output current flows to the LEDs. After some time noted as T, which is determined by a control loop of the LED current, M1 gets closed and no ballast output current flows to the LEDs. The shunting action is performed and the turning off/on is the pulse width modulation control. M1 stays closed until the next zero crossing of the ballast output current. In case of mains dip, a phase of the mains is lost, the mains voltage that is applied to the inductor L_ballast of the ballast is zero. In an operation wherein the pulse width control of the shunt switch is not overridden, the shunt switch M1 will stay turned on after the duration T, as shown in the shaded/dash-dot square in the gate M1 curve. Then it is 0V at the input (mains dip) and it is zero at the output since the shunt switch M1 is closed. For this reason, demagnetization of inductor L_ballast takes infinitely long time and it saturates quickly when the mains recovers. The embodiment suggests a principle that uses detection of mains dip, and makes/keeps the shunt switch MOSFET M1 in high impedance state once the dip is detected. With this overriding, the shaded/dash-dot square never takes effect and the gate voltage of the shunt switch M1 is constantly low. In this way, the voltage that is applied to the inductor L_ballast is not zero anymore, but the LED voltage. Ballast current quickly decays to zero and the flux density reduces. The shunt switch M1 stays open till next zero crossing occurs, and keeps open for the duration T, and then closes such that the switching action is restored. In this way, the saturation of the inductor L_ballast can be avoided at least partially and the input current stays within the limits of the MCB. In a further embodiment as illustrated in FIG. 11, when the shunt switch MOSFET M1 is in high impedance state, the configuration of the LED1 and LED2 is changed to high forward voltage state, via connecting the LEDs in series. This is implemented by turning on the switch S2 and turning off the switches S1 and S3. In normal operation without the mains dip, the LEDs are connected in parallel to restore the low forward voltage, implemented by turning on the switches 51 and S3 and turning off the switch S2. This low forward voltage avoids a mis-trigger of the ignitor in the ballast fixture.

In a further embodiment, because of the ballast recovery after the dip the peak current of the LEDs is observed in the following mains cycle(s). Exceeding specification of the peak pulsed current of the LEDs will result in early failure of the lamp. Therefore, the shunt switch M1 is also turned on during the period T (in which the shunt switch M1 is designed to be turned off), as soon as the peak LED current is reached. The switch M1 is turned off when LED current decays from the peak, by for example 10% to 20%. It may take several switching actions before LED current finally reduces back to the safe value. This is shown in the dashed block in FIG. 9 wherein the shunt switch is turned on and off alternatively in the subsequent AC period after a recovery of the phase of the AC voltage input to the ballast, so as to reduce the current amplitude provided to the LED.

With reference to the FIG. 11, a flip-flop component based implementation is proposed. A mains dip detection component DIP resets RS flip-flop that via output Q when it detects the mains dip, and gate control logic AND overrides the action of control. In this way the shunt switch M1 gets open. The dip detection method is described 2017ID80243. For the normal control of the shunt switch based on pulse width modulation, in zero crossing, the current of L_ballast decays to zero and a zero crossing detection component ZCD will detect this zero crossing. The RS flip-flop will be set again by the ZCD when the current starts to flow through L_ballast. Both DIP and ZCD detectors are using the input current of the lamp that is sensed over resistor Rzcd in FIG. 10. The current from the ballast to the load, for controlling the above mentioned period T/the pulse width modulation, is sensed as Iripple over the Rsense resistor in FIG. 10. The current of the LEDs I_LED is sensed over Rs_ILED resistor in FIG. 10. The comparator "==" forces turn-on of the shunt M1 via OR gate and overrides all other actions of the other circuits. This is for the case that when the current through the LED (either directly from the ballast or from the buffering capacitor $C_{elcap}$) is too large, the shunt switch will be turned on to avoid any more power to the LED.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A retrofit lamp to be used with a ballast, comprising:
   a pair of input terminals adapted to connect to said ballast;
   an output load to be driven by said ballast and comprising at least a lighting element (LED);
   a shunt switch (M1) in parallel with said output load and adapted to shunt said input terminals using pulse width control so as to tune the current through the lighting element;
   a detection circuit adapted to detect an abnormal drive condition of the retrofit lamp;
   a control circuit adapted to override the pulse width control of the shunt switch and to hold the shunt switch at a stable state for a certain duration; and
   a diode bridge rectifier (D1, D2, D3, D4) between the input terminals and the output load, and the shunt switch (M1) is placed between the diode bridge rectifier and the output load,
   wherein said abnormal drive condition is a short circuit of at least one diode (D1, D2, D3, D4) in said diode bridge rectifier, and
   wherein said control circuit is adapted to hold the shunt switch at a low impedance state to override said pulse width control when the short circuit of at least one diode in said diode bridge rectifier is detected.

2. A retrofit lamp as claimed in claim 1, said abnormal drive condition is an overcurrent condition, and the detection circuit comprises:
   a current sensing element (R) adapted to sense the current through the shunt switch when said shunt switch is conductive; and
   a comparing circuit (U1) adapted to compare the sensed current with a threshold;
   wherein the control circuit is adapted to hold the shunt switch at high impedance state to override said pulse width control when the sensed current exceeds the threshold.

3. A retrofit lamp as claimed in claim 2, wherein the current sensing element comprises a current sense resistor (R) for sensing a current flowing to or from one of the input terminals, and said current sense resistor is in series between the diode bridge rectifier and an interconnection of the shunt switch (M1) and the output load, and the control circuit is adapted to turn off said shunt switch.

4. A retrofit lamp as claimed in claim 3, wherein the comparing circuit comprises a comparator (U1) for comparing the voltage across the current sense resistor with a reference value (limit), and wherein the output of the comparator is used to control the shunt switch (M1).

5. A retrofit lamp as claimed in claim 2, wherein the control circuit comprises a control gate between the output of the comparing circuit and a control terminal of the shunt switch (M1).

6. A retrofit lamp as claimed in claim 1, wherein the output load further comprises a current limiting circuit in series with the lighting element.

7. A retrofit lamp as claimed in claim 6, wherein the current limiting circuit is adapted to limit the current through the lighting element below a maximum value.

8. A retrofit lamp as claimed in claim 6, wherein the current limiting circuit comprises a current source circuit (Q1, Q2, R2, R3).

9. A retrofit lamp as claimed in claim 1, wherein said detection circuit comprises a voltage detection circuit (R3, C3, Q3) coupled at least to a first diode in said diode bridge rectifier and adapted to detect the short circuit according to a change of a voltage on said first diode, and said control circuit is adapted to turn on said shunt switch constantly in both positive and negative half cycles of an output of the ballast.

10. A retrofit lamp as claimed in claim 1, wherein the lighting element comprises an LED array, and/or the retrofit lamp comprises a tubular LED lamp or a high bay lamp.

11. A retrofit lamp to be used with a ballast, comprising:
    a pair of input terminals adapted to connect to said ballast;
    an output load to be driven by said ballast and comprising at least a lighting element (LED);
    a shunt switch (M1) in parallel with said output load and adapted to shunt said input terminals using pulse width control so as to tune the current through the lighting element;
    a detection circuit adapted to detect an abnormal drive condition of the retrofit lamp;
    a control circuit adapted to override the pulse width control of the shunt switch and to hold the shunt switch at a stable state for a certain duration; and
    A retrofit lamp as claimed in claim 1, wherein said abnormal drive condition comprises an absence of a phase of an AC voltage input to the ballast, and
    said control circuit is adapted to hold the shunt switch at high impedance state to override said pulse width control in synchronization with said absence of the phase of the AC voltage input into the ballast.

12. A retrofit lamp as claimed in claim 11, wherein said control circuit is further adapted to:
    control the shunt switch to turn on and off alternatively in at least one subsequent AC period after a recovery of the phase of the AC voltage input to the ballast so as to reduce the current amplitude provided to the output load; and
    the control circuit is further adapted to:
    switch a configuration of the output load to a high forward voltage state when holding the shunt switch at high impedance state in the abnormal drive condition of the retrofit lamp; and
    switch the configuration of the output load to a low forward voltage state otherwise.

13. A retrofit lamp as claimed in claim 11, wherein said control circuit comprises:
    a current sensing component for sensing the current from the ballast;
    a zero crossing detection component for detecting a zero crossing of the current from the ballast;
    a dip detection component for detecting said absence of the AC voltage input to the ballast; and
    a flip-flop component for outputting an logic to turn off said shunt switch upon a trigger of the detected zero crossing at the zero crossing detection component or the detected absence of the AC voltage input at the dip detection component.

* * * * *